(12) United States Patent
MacDonald et al.

(10) Patent No.: US 8,114,514 B1
(45) Date of Patent: Feb. 14, 2012

(54) REINFORCEMENT COMPOSITION AND METHOD THEREOF

(75) Inventors: Clifford N. MacDonald, Inver Grove Heights, MN (US); Tracy H. Lang, Mercer, PA (US)

(73) Assignee: Forta Corporation, Grove City, PA (US)

( * ) Notice: Subject to any disclaimer, the term of this patent is extended or adjusted under 35 U.S.C. 154(b) by 47 days.

(21) Appl. No.: 12/539,823

(22) Filed: Aug. 12, 2009

(51) Int. Cl.
*B32B 17/12* (2006.01)
(52) U.S. Cl. .............. 428/364; 428/293.4; 428/373; 428/359; 428/362; 428/370; 428/374
(58) Field of Classification Search ............ 428/364, 428/293.4, 373, 359, 362, 370, 374
See application file for complete search history.

(56) References Cited

U.S. PATENT DOCUMENTS

| | | | |
|---|---|---|---|
| 4,346,135 A | 8/1982 | Arnheiter et al. | |
| 5,807,458 A | 9/1998 | Sanders et al. | |
| 5,897,928 A | 4/1999 | Sanders et al. | |
| 6,016,872 A | 1/2000 | Davis | |
| 6,164,380 A | 12/2000 | Davis | |
| 6,753,081 B1 | 6/2004 | Lovett et al. | |
| 7,168,232 B2 * | 1/2007 | Lovett et al. | 57/243 |
| 7,192,643 B2 | 3/2007 | Perez et al. | |

* cited by examiner

*Primary Examiner* — Robert D. Harlan
(74) *Attorney, Agent, or Firm* — Eckert Seamans et al.; Carol A. Marmo, Esq.

(57) ABSTRACT

The present invention relates generally to a reinforcement composition and a method of reinforcing an asphalt cement concrete composition. The reinforcement composition includes a core and an outer container. The core includes a plurality of fibers, and the outer container includes a polyolefin selected from the group consisting of polyethylene, polypropylene, and mixtures thereof.

11 Claims, No Drawings

REINFORCEMENT COMPOSITION AND METHOD THEREOF

FIELD OF THE INVENTION

The present invention relates to a reinforcement composition and a method of reinforcing an asphalt cement concrete composition.

BACKGROUND OF THE INVENTION

It is known that the addition of a reinforcement component to building materials, such as concrete, including asphalt cement concrete and portland cement concrete and the like, can add strength, toughness, and durability to improve the integrity of the material properties. There are a variety of reinforcement fiber additives known in the art that can provide some of these characteristics to concrete building materials. Typical reinforcement materials that are added to concrete include, for example, various gauges of wire mesh or reinforcement fibers, such as, asbestos fibers, glass fibers, steel fibers, mineral fibers, natural fibers, synthetic fibers (such as polymer and aramid fibers), and cellulose fibers. A non-limiting example of suitable reinforcement fibers includes Basalt fibers. Some reinforcement fibers are better suited for particular applications than others. For example, asbestos fibers are known to provide effective reinforcement but, due to environmental and health concerns these fibers, are not extensively used. In addition, some fibers are relatively expensive.

Some advances have been made in the area of fiber reinforcement to provide increased toughness and durability, and reduce cracking in the matrix of concrete building materials. However, the known reinforcing fibers have a number of disadvantages, such, as for example, it is difficult to handle loose fibers and to control their introduction into a concrete. It is desired to improve the ease of handling the fibers and for the fibers to mix readily and distribute uniformly in a cement concrete.

SUMMARY OF THE INVENTION

In one aspect of the present invention, a reinforcement composition is provided. The composition includes a core and an outer container; the core including a plurality of fibers and the outer container comprising a polyolefin selected from the group consisting of polyethylene, polypropylene, and mixtures thereof, wherein the core is contained within the outer container.

The plurality of fibers can be selected from the group consisting of synthetic fibers, natural fibers, and mixtures thereof. Further, the synthetic fibers can be selected from the group consisting of polymer fibers, aramid fibers, and mixtures thereof. The polymer fibers can be selected from the group consisting of polyolefin fibers, polyamide fibers, polyvinyl-chloride fibers, and mixtures thereof. The polyolefin fibers can be selected from the group consisting of polypropylene fibers, polyethylene fibers, and mixtures thereof. The plurality of fibers each or together can be configured in a predetermined number of twists.

The outer container can also comprise amine. Furthermore, the outer container can comprise a plurality of fibers.

The plurality of fibers can be selected from the group consisting of fibers that are meltable in an asphalt material, fibers that are non-meltable in an asphalt material, and mixtures thereof.

The outer container can be dispersible, and further, can be dispersible as a result of melting under heated conditions.

Another aspect of the present invention, provides a method of reinforcing an asphalt composition including providing a container having a core contained therein; the core comprising a plurality of fibers, and the container comprising a polyolefin selected from the group consisting of polyethylene, polypropylene and mixtures thereof; introducing the container, aggregate, and binder into an asphalt-containing chamber; and forming an asphalt material.

The plurality of fibers can be selected from the group consisting of synthetic fibers, natural fibers, and mixtures thereof. Further, the synthetic fibers can be selected from the group consisting of polymer fibers, aramid fibers, and mixtures thereof.

The container can further comprise a plurality of fibers.

The plurality of fibers can be present in an amount of from about 0.0001 to about 10.0 percent by volume per ton of the asphalt material.

The container can be dispersed when a transition temperature of the outer container is reached or exceeded in the asphalt-containing chamber. The dispersed outer container can reduce the friability of the plurality of fibers in the asphalt-containing chamber.

The asphalt-containing chamber can be selected from the group consisting of an asphalt mixing machine and associated machines located up-line and down-line of the asphalt mixing machine.

In an embodiment of the method of the present invention, more than one container may be introduced into the asphalt-containing chamber.

The asphalt-containing chamber can be a component of a process selected from the group consisting of a batch process and a continuous process.

DETAILED DESCRIPTION OF THE INVENTION

The present invention relates to a reinforcement composition for incorporation into an asphalt cement concrete composition. The presence of the reinforcement composition can result in at least one change in the strength, durability, toughness, integrity, and other material properties of the asphalt.

As used herein and the claims, the term "asphalt" means asphalt cement concrete. Two types of cement are Portland cement and asphalt cement. The term "asphalt cement concrete" refers to the use of asphalt cement. The term "cement" refers to the binder that holds together the concrete. As used herein, the cement also can be referred to as "binder" or "liquid asphalt." The term "concrete" refers to a gradation of fine and coarse aggregate, such as, but not limited to sand and rock.

The reinforcement composition of the present invention includes a core and an outer container. The core is encompassed by and contained within the outer container. The contents of the core includes a plurality of fibers. Suitable fibers for use in the core can include a wide variety of fibers known in the art to reinforce building materials, such as asphalt. The fibers can be synthetic or natural. Natural fibers can include wood-derivative fibers and mixtures thereof. Synthetic fibers can include, but are not limited to, polymer fibers, aramid fibers, and mixtures thereof. Polymer fibers can include, but are not limited to, polyolefin fibers, such as polypropylene and polyethylene, polyamide fibers, polyvinyl-chloride fibers, and mixtures thereof. In one embodiment of the present invention, the plurality of fibers in the core include aramid fibers and a blend of polyolefin fibers. In another embodiment of the present invention, the aramid fibers are present in an amount of from 0 to about 100 percent by volume of the total fibers. In still another embodiment of the present invention, the polyolefin fibers are present in an amount of from greater than 0 to 100 percent by volume of the total fibers. The fibers can include a mixture of fibers that melt in the asphalt material and fibers that do not melt in the asphalt material.

Suitable fibers for use in the present invention can be in a wide variety of shapes, sizes, and forms. In general, loose fibers are difficult to handle, and therefore, it is desirable to configure and control the fibers, such as to improve the ease of handling, e.g., for adding the fibers to the asphalt mixing process. Further, it is desirable for the fibers to readily and uniformly disperse in the asphalt material within the asphalt mixing machine or associated machinery. Moreover, it is desirable to limit or reduce the friability of the fibers. For example, aramid fibers are known in the art to be friable and may generate dust, which can result in clogging of filters in the asphalt mixing machine and related machinery.

The fibers, for example, can be flat, such as in the form of a sheet, or cylindrical, such as in the form of a tube or cord. The tubes or cords can be bundled together in a circumferential wrap and cut to a predetermined length using conventional techniques and methods known for cutting fibers. The length of the fibers can vary widely, and the length can be such that the fibers are dispersible in an asphalt material. In non-limiting embodiments, the fibers may be cut into a length within the range of about 19 to 60 mm.

The fibers, individually or together in various combinations and proportions, can be fibrillated (i.e., pulled apart to form a net like structure) or non-fibrillated. The fibers can be configured in a predetermined number of twists and turns. For example, the fibers suitable for use in the present invention can include a fiber component, as disclosed in U.S. Pat. No. 7,168,232 ("the '232 patent"). The fiber component is a twisted bundle comprised of multiple strands of a non-fibrillating monofilament having a degree of twist greater than about 0.9 turns per inch. The '232 patent further discloses the twisted fiber component with another fiber component, discrete from the twisted fiber component, that is fibrillated. In U.S. Pat. No. 4,346,135, a fibrous reinforcing means, including at least two various groups of fibrous articles, is disclosed. At least one of the groups consists of fibrous articles in the form of a closed filamentary net. In U.S. Pat. No. 6,753,081, a synthetic fiber blend is disclosed. The synthetic fiber blend includes a first fiber component formed of a homopolymer polypropylene fiber, and a second fiber component is a copolymer formed of a polypropylene and a high-density polyethylene. The first fiber component is fibrillated, and the second fiber component is a twisted bundle of multiple strands of a non-fibrillating monofilament. The disclosures of U.S. Pat. Nos. 7,168,232; 6,753,081; and 4,346,135 are incorporated herein by reference.

The container of fibers can be added to the asphalt material in a variety of amounts. The amount can depend on various factors, such as, but not limited to, the particular fibers selected and the process used to produce the asphalt material (e.g., batch or continuous). The amount of containers can be referred to as a dosage. One or more dosages can be added to the asphalt material. For example, in one embodiment of the present invention, one dosage may be added per ton of asphalt material, and in another embodiment of the present invention, a plurality of dosages may be added per ton of asphalt material. In alternate embodiments, the plurality of dosages can be combined or attached together and added to the asphalt material. For example, the dosages can be glued together.

The composition of the core can include various materials in addition to the plurality of fibers. The materials can be in various forms, such as, but not limited to, pellets or powder. The materials can include, but are not limited to, chemical compounds that are typically used in preparing asphalt and/or are known to provide advantages to the process and/or beneficial properties in the resultant asphalt material. For example, amine can be included in the core. The amine may be in the form of pellets or powder.

The outer container of the asphalt reinforcement composition of the present invention encompasses and contains or holds the core. The outer container is constructed of a material including, but not limited to, polyolefin. The polyolefin can be selected from a wide variety of polyolefins known in the art. Non-limiting examples of suitable polyolefins can include, but are not limited to, polyethylene, polypropylene, and mixtures thereof. The composition of the outer container can further include other additives, such as those typically used in preparing an asphalt material and/or those known to produce advantages to the process and/or beneficial properties in the resultant asphalt material. Without intending to be bound by any theory, it is believed that, upon dispersal of the outer container, the materials of which the outer container is constructed will be dispersed into the asphalt material, and therefore, any additives that are typically included in the asphalt material can be included in the composition of the outer container. In one embodiment of the present invention, the outer container includes amine. The amine can be selected from a wide variety of amines known in the art. In another embodiment of the present invention, the outer container can include fibers. Suitable fibers for use in the outer container can be selected from those previously disclosed herein. The fibers in the outer container can be the same as or different from the fibers in the core.

The asphalt reinforcement composition of the present invention is introduced into the asphalt material prior to field placement. The reinforcement composition can be introduced into the asphalt material during various steps in the manufacture process. For example, the reinforcement composition can be added in an asphalt mixing machine or associated machinery, or in a hopper, or in a transportation vehicle, or after discharge from the mixing machine or associated machinery, or the hopper or the transportation vehicle. The reinforcement composition can be added at various steps in the process provided that there is sufficient mixing that occurs at the various steps in the process prior to field placement to incorporate the reinforcement composition into the asphalt material.

In addition to the asphalt reinforcement composition, compounds used in producing an asphalt material include, but are not limited to, aggregate and binder, such as liquid asphalt. Other additives may also be added to the asphalt material (for example, in the asphalt mixing machine), such as, for example, lime powder. The process of manufacturing an asphalt material can include a batch or continuous process. As described above, the asphalt reinforcement composition can be added to the asphalt material during the manufacturing process prior to field placement. For example, in an embodiment of the batch process, the asphalt reinforcement composition can be added to the mixing chamber, having mixing blades, of the asphalt mixing machine prior to introducing aggregate and liquid asphalt. For example, in an embodiment of the continuous process, wherein a drum mixer is used, the asphalt reinforcement composition can be added to the process at any time prior to the introduction of liquid asphalt. The manufacture of an asphalt material consists of a thermal process, and therefore, includes heating the ingredients, such as in the chamber of the asphalt mixing machine. The temperature of the asphalt material can vary and can include those temperatures typically used in commercially-operated asphalt manufacturing facilities. In an embodiment of the present invention, the temperature can be within a range of about 212° F. to 375° F., or higher than 700° F.

The outer container of the asphalt reinforcement composition is dispersible in the asphalt material. In alternate embodiments of the process of the present invention, the reinforcement composition can be dispersed in the asphalt material in the asphalt mixing machine, or in associated machinery located either up-line or down-line from the mixing machine. In one embodiment of the present invention, the outer container disperses as a result of melting. The transition temperature of the outer container, i.e., the temperature at which the outer container melts or dissolves, such as its melting point, can depend on the composition of the outer container, e.g., the materials from which the outer container is made. As the transition temperature is reached or exceeded in the asphalt or in the chamber containing the asphalt, such as the asphalt mixing machine, the outer container melts and is dispersed within the asphalt material. The transition temperature can be reached or exceeded, and the outer container can melt and be dispersed before, during, or after the mixing of the asphalt material. Further, upon dispersal of the outer container, the fibers contained within the core are released and mixed into the asphalt material. The fibers may have a transition temperature such that they may or may not be meltable within the asphalt material. The asphalt reinforcement composition can be added to the asphalt material in varying amounts. Typically, the amount added is such that desired properties of the asphalt material are achieved. The amount of the reinforcement composition used can depend on the composition of the core, the composition of the outer container and/or various processing conditions employed. In an embodiment of the present invention, fibers can be added to the asphalt material in an amount such that the fibers provided from the core, or the outer container, or a combination thereof, is greater than zero. In another embodiment, the fibers from the core, outer container, or combination thereof, can be at least 10.0 percent or greater by volume per ton of asphalt material. In yet another embodiment of the present invention, the fibers from the core, outer container, or combination thereof can be in a range of from about 0.0001 percent to about 5.0 percent by volume per ton of the asphalt material.

Without intending to be bound by any theory, it is believed that introduction of the fibers into the asphalt material in accordance with the asphalt reinforcement composition of the present invention (i.e., outer container and core configuration) will result in less entanglement and less clumping of the fibers as compared to the fibers being introduced loosely into the asphalt or chamber containing the asphalt (e.g., asphalt mixing machine). Further, it is believed that, since there is less entanglement and less clumping of the fibers, a lesser amount of fibers will need to be added to the asphalt material when employing the asphalt reinforcement composition of the present invention instead of loosely adding the fibers.

Further, without intending to be bound by any theory, it is believed that melting of the outer container and/or core may limit or reduce the friability of the fibers, such as, for example, aramid fibers, and may improve the random dispersibility of non-melting fibers used in the asphalt reinforcement composition.

By way of example, the asphalt reinforcement composition of the present invention can be incorporated into the manufacture of various asphalt building materials and products used for building or construction, such as, for example, structural pavements, airport runways and tarmacs, bridge deck overlays, floors, and pre-cast asphalt products. The asphalt reinforcement composition of the present invention may also be used for repair, rehabilitation, retrofit, and renovation of existing products or structures, such as, for example, in overlays, and repairs of airport pavements, bridge decks, parking areas, roadways, and the like, including patching and filling potholes.

In addition to reinforcement, the incorporation of the asphalt reinforcement composition of the present invention in, for example, cast asphalt material, modifies the cracking mechanism and reduces the propagation of micro-cracking caused by shrinkage. It is believed that relative to non-reinforced asphalt, the resultant cracks of fiber reinforced concrete of the present invention are smaller in width, the permeability of the material is reduced, and the ultimate cracking strain is enhanced. Furthermore, the fibers employed in the present invention are capable of carrying a load across the crack. As a result, the asphalt material may have at least one change in its material properties, such as toughness, residual load carrying ability after the first crack, and impact resistance. Moreover, it is believed that the fibers used in the present invention produce an asphalt material having improved strength compared to non-reinforced asphalt, such that the asphalt material of the present invention can be suitable for locations where the asphalt will experience both high and low temperatures and areas subjected to heavy loadings (e.g., high traffic areas) and heavy concentrations of truck traffic as well as many other uses.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

The invention claimed is:

1. A method of reinforcing an asphalt composition, comprising:
   providing a reinforcement composition comprising an outer container and a core, the outer container having the core contained therein, the core comprising a plurality of fibers, and the outer container comprising a polyolefin selected from the group consisting of polyethylene, polypropylene, and mixtures thereof; and
   introducing the reinforcement composition into an asphalt composition, said asphalt composition comprising aggregate and binder,
   wherein the outer container of the reinforcement composition is constructed such that when a specified temperature is reached in the asphalt composition, the plurality of fibers are released from the outer container and mixed into the asphalt composition.

2. The method of claim 1, wherein the plurality of fibers is selected from the group consisting of polymer fibers, aramid fibers, and mixtures thereof.

3. The method of claim 1, wherein the outer container further comprises a plurality of fibers.

4. The method of claim 1, wherein the plurality of fibers is present in an amount of from about 0.0001 to about 10.0 percent by volume per ton of the asphalt material.

5. The method of claim 1, wherein the outer container is dispersed in the asphalt composition when a transition temperature of the outer container is reached or exceeded.

6. The method of claim 5, wherein the dispersed outer container reduces friability of the plurality of fibers in the asphalt composition.

7. The method of claim 1, wherein the asphalt composition is contained in a chamber selected from the group consisting of an asphalt mixing machine, and associated chambers located up-line and down-line of the asphalt mixing machine.

8. The method of claim 1, wherein more than one container is introduced into the asphalt composition.

9. The method of claim 7, wherein the chamber is a component of a process selected from the group consisting of a batch process and a continuous process.

10. The method of claim 2, wherein the plurality of fibers includes a blend of aramid fibers and polyolefin fibers.

11. A method of reinforcing an asphalt composition, comprising:

providing a core comprising a plurality of fibers;

encompassing the core within an outer container to form a reinforcement composition;

introducing the reinforcement composition into an asphalt composition, said asphalt composition comprising aggregate and binder;

heating the asphalt composition to a specified temperature, the outer container of the reinforcement composition being constructed such that when the specified temperature is reached in the asphalt composition, the plurality of fibers are released from the outer container and mixed into the asphalt composition;

releasing the plurality of fibers from the outer container; and mixing the plurality of fibers into the asphalt composition.

* * * * *